(12) United States Patent  
Uhlik (10) Patent No.: US 7,920,897 B2  
(45) Date of Patent: Apr. 5, 2011

(54) INTERFERENCE SUPPRESSION IN COMPUTER RADIO MODEMS

(75) Inventor: Christopher R. Uhlik, Danville, CA (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 11/715,080

(22) Filed: Mar. 6, 2007

(65) Prior Publication Data

US 2007/0153010 A1 Jul. 5, 2007

Related U.S. Application Data

(62) Division of application No. 10/099,723, filed on Mar. 14, 2002, now abandoned.

(51) Int. Cl.
H04B 1/38 (2006.01)

(52) U.S. Cl. ........ 455/557; 455/558; 455/572; 455/570; 455/317; 455/310; 455/296; 455/67.13; 455/63.1; 455/283; 455/231; 455/66.1; 455/343.1

(58) Field of Classification Search ......................... None
See application file for complete search history.

(56) References Cited

U.S. PATENT DOCUMENTS

| 5,604,928 A | 2/1997 | Hamano et al. |
| 5,630,148 A | 5/1997 | Norris |
| 5,826,092 A | 10/1998 | Flannery |
| 6,173,409 B1 | 1/2001 | Watts et al. |
| 6,542,726 B2 | 4/2003 | Watanabe |
| 6,894,982 B1 | 5/2005 | Shimizu |
| 7,035,606 B2 * | 4/2006 | Matsuura et al. ............. 455/147 |
| 7,050,838 B1 * | 5/2006 | Muramatsu et al. ....... 455/556.1 |
| 2001/0021981 A1 | 9/2001 | Konaka et al. |

* cited by examiner

Primary Examiner — Charles N Appiah  
Assistant Examiner — Willie J Daniel, Jr.  
(74) Attorney, Agent, or Firm — Blakely, Sokoloff, Taylor & Zafman LLP (57) ABSTRACT

The present invention can reduce interference generated by processors and other computing devices when a connected radio is active. In one embodiment, the invention may include determining a start of reception of radio signals by a radio, generating a radio active signal, transmitting the radio active signal to a coupled computer to affect the radio interference generated by the coupled computer. The embodiment may further include determining an end of reception of radio signals by the radio, generating a radio not active signal, and transmitting the radio not active signal to the coupled computer to affect the radio interference generated by the coupled computer.

28 Claims, 3 Drawing Sheets

INTERFERENCE SUPPRESSION IN COMPUTER RADIO MODEMS

This application is a Divisional of U.S. patent application Ser. No. 10/099,723, filed on Mar. 14, 2002 now abandoned, and entitled "Interference Suppression in Computer Radio Modems", the priority of which is hereby claimed.

BACKGROUND OF THE INVENTION

1. Field of the Invention

The present invention applies to the field of wireless communications systems using connected microprocessor-based computers and, in particular, to reducing interference from the microprocessor when a connected radio is active.

2. Description of the Prior Art

Mobile radio communications systems such as cellular voice and data radio systems typically are designed for lightweight, inexpensive user terminals, such as cellular telephones or wireless web devices. The user terminals are designed for radio reception in addition to any data processing tasks that are also provided. User terminal radio designers typically pay strict attention to frequency planning and spurious signal analysis. All clock frequencies in the system design including all significant harmonic frequencies and intermodulation frequencies that might occur are analyzed and accommodated or corrected. By careful selection of the clock frequencies, it is generally arranged that no significant harmonics fall inside certain frequency bands. Radio filters and shielding are relied upon to attenuate any remaining internally generated interference to acceptable levels.

When radio services are used for computer data transport, radio modems can be installed in or attached to general purpose computers or data appliances that are not designed with any particular radio system in mind. Laptop computers are typically not designed to accommodate any radio communications system. When a general purpose computer, such as a laptop computer is combined with a general purpose radio modem, such as a PCMCIA card, the radio designer does not have the luxury of confining all interference clock frequencies to special values which do not have harmful harmonic components. As a result, the computer can interfere significantly with the radio's reception. In extreme cases even transmission can be affected. The modulators, down-converters, amplifiers and even RF stages can all be impaired by interference generated by the computer.

The level of interference from the general purpose computer increases, as the clock speed increases. For computers with clock speeds in the gigahertz range, high frequency signals are generated inside the computer which are in commonly used data communications radio bands or in the intermediate frequency bands used by a heterodyne radio receiver. Much of the interference comes from connectors and buses between components in the computer, however, some components such as disk drives can generate significant interference notwithstanding any bus activity.

It is possible to design the general purpose computer to work well with radio components in a manner similar to that for cellular telephones and mobile data terminals. This, however, can add significantly to the design cost and any shielding will add to the manufacturing cost and weight of the computer. The designer would have greater design freedom if radio interference could be ignored. If a radio is added to a computer using, for example a PCMCIA (Personal. Computer Memory Card International Association), Compact PCI (Peripheral Component Interconnect) or SDIO (Secure Digital Input-Output) slot, the computer designer may not be able to anticipate the receive frequencies of the radio system. If the designer does not know which radio system is being used and the receive frequencies for that system, then the computer cannot be designed to avoid interference.

BRIEF SUMMARY OF THE INVENTION

The present invention can reduce interference generated by processors and other computing devices when a connected radio is active. In one embodiment, the invention may include determining a start of reception of radio signals by a radio, generating a radio active signal, transmitting the radio active signal to a coupled computer to affect the radio interference generated by the coupled computer. The embodiment may further include determining an end of reception of radio signals by the radio, generating a radio not active signal, and transmitting the radio not active signal to the coupled computer to affect the radio interference generated by the coupled computer.

In another embodiment, the invention may include receiving a radio active signal at a computer having a CPU (Central Processing Unit) from a coupled radio, adjusting system operating parameters of the computer to reduce interference with the radio, receiving a radio not active signal at the computer from the coupled radio, and readjusting the system operating parameters of the computer for operation without regard to interference with the radio.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

A significant amount of the radio interference generated by a computer is linked to high clock rate activity on the computer system bus and in some peripherals such as hard disk controllers. Left unchecked, this interference can seriously impact the performance of nearby radios. If the clock can be slowed down or stopped while the radio is receiving, then much of the interference can be eliminated. If other components, such as hard disk controllers, display drivers, network interface cards etc. can be turned off, then interference can be reduced even more.

Many portable devices are also battery powered, and have sophisticated subsystems for minimizing battery charge consumption. The power management subsystem greatly affect the level of radio interference generated by the portable device by such things as slowing down the main microprocessor clock or clock multiplier frequencies, stopping the clock for short periods of time when computations are not needed, and slowing down or shutting off peripherals that are not in use. As these systems become more robust and less expensive, they are also being incorporated into fixed and desktop computers to save energy.

In one embodiment of the present invention, the power saving features of the computer can be exploited to affect the level of radio interference by turning down or turning off the high frequency CPU (Central Processing Unit) clock while radio reception is in progress. The effect on the user is very small for several reasons. First, in many radio communication systems, radio reception is in short packets with long gaps, so the clock is turned down or off only for a small portion of the time. In addition, maximum computation speed is often not required during the actual reception of radio data. Generally, during those moments, the computer is waiting for the data to be completely received. After the packet, web page download, etc., has been completely received the computer can use its maximum computational capacity to render the web page, video frame, speech burst etc. with minimum latency.

By quieting the computer for fractions of a millisecond at just the right times, the radio receiver can be protected from the computer's interference without expensive shielding. In addition it is no longer necessary to design the computer for any particular set of radio transmission frequencies and harmonics. The computer can be used on any radio system and any frequency set. Similarly, peripherals that create large amounts of interference can be successfully used with the radio, provided that they can also be quieted at the key times. This expands the choice of possible peripherals. Finally, the shielding and clocking systems of the computer do not have to be redesigned each time the microprocessor is upgraded to a new faster model.

System Operation

Figure 1:
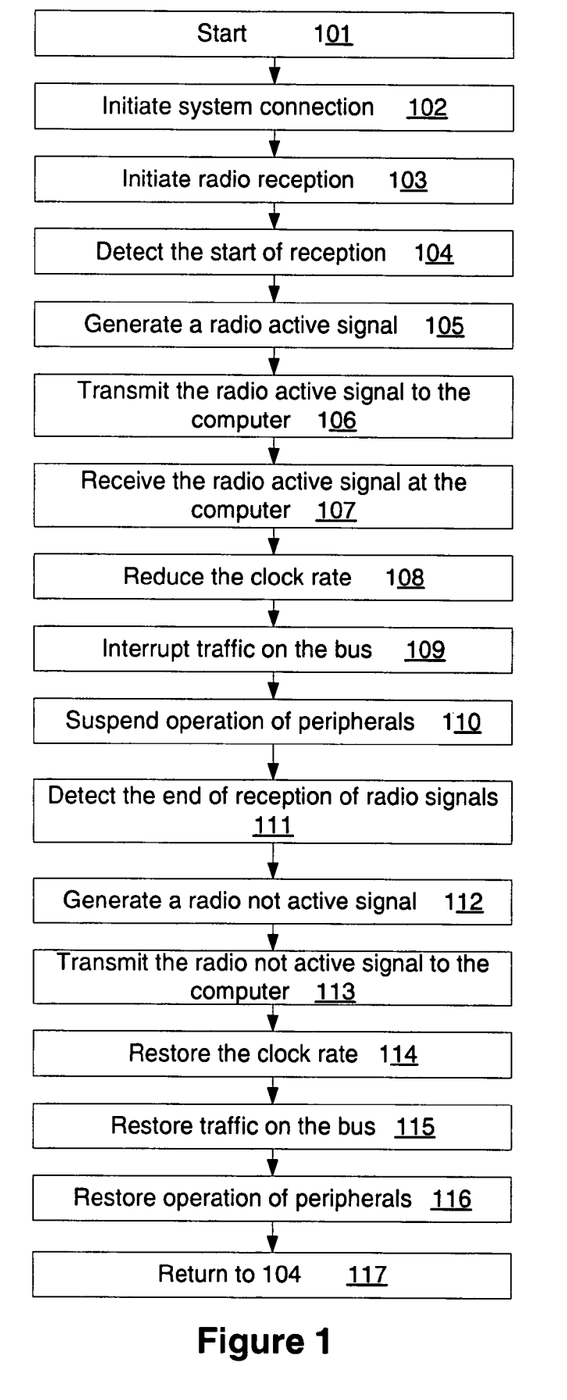
FIG. 1 is a simplified flow chart of a method of carrying out one embodiment of the invention.

The operation of the computer system 10 and coupled radio subsystem 26 can be understood in one embodiment with reference to the flow diagram of FIG. 1. For purposes of the present invention, the nature of the computer is not important, The computer can be any type of microprocessor-controlled device from a mobile workstation to a PDA (personal digital assistant) to a mobile wireless web appliance, such as a telephone, personal stereo or web tablet. The process can start 101 at any time after the system has been configured. The connection between the computer system and the radio subsystem can then be initiated 102. This can occur when the computer boots up. In some embodiments, for example, if the radio is coupled through a plug and play PC (Personal Computer) card or a USB (Universal Serial Bus) connector, the connection will be initiated automatically using the standard protocols. In other embodiments the connection must be configured manually or using set-up software.

The radio can then acquire access to the radio network or to the terminal with which it will communicate 103. This can occur before or after the connection is initiated. In a cellular radio system, the radio reception and transmission is initiated by the radio subsystem which listens to a pre-determined broadcast channel, registers through a base station and requests a traffic channel according to the particular requirements of the system.

The radio can obtain access on any one or more of a variety of different systems. The radio communications systems can be voice or data systems and can be used by the radio subsystem to exchange voice or data with any terminal that can be reached through the radio communications system directly or indirectly. The particular wireless communication system may be a fixed-access or mobile-access wireless network using multiple access systems, such as time division multiple access (TDMA), frequency division multiple access (FDMA) and code division multiple access (CDMA).

Multiple access can be combined with frequency division duplexing (FDD) or time division duplexing (TDD). In one embodiment, the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used. The present invention can also be applied to low power and unlicensed spectrum communications systems for communications over short distances and to peer level systems.

Once the radio subsystem is initiated for radio reception it can begin to operate within the particular protocols and standards of the radio system. It is then ready to determine when it will begin reception of traffic signals 104. Even before a traffic channel or data path has been established, the radio subsystem can determine or predict times when it desires to receive radio signals. For example, in the cellular system, mentioned above, the radio subsystem begins by listening to a broadcast channel. The radio subsystem can determine when it will begin listening to the broadcast channel. This prediction process can be done in a variety of different ways. The radio subsystem can enhance reception by signaling the computer in advance of attempting to receive any packets on the system. This allows time for the computer system to react to the signal.

The determination can be made by reference to the characteristics of the channel that has been assigned to the radio. For example, in a GSM system, the radio subsystem will be assigned to a particular slot or set of slots in a repeating TDMA frame. The timing of the slots is predictable based on a common timing standard for the system which will be used by the receiver. Accordingly, the radio subsystem CPU can predict each of the recurring slots simply by reference to the assignment and the timing reference used by the radio subsystem.

When the radio subsystem determines that it will begin reception of traffic over the wireless communications system, 104, it generates a radio active signal 105 which it transmits to the computer system 106. This radio active signal can be sent in response to a poll or interrogation signal from the computer microprocessor. The specific nature of the signal and how it is transmitted will depend upon the specific details of the communications protocol for the connection between the radio subsystem and the computer system. In some systems, for example a Compact PCI connection, the radio subsystem can generate a radio active packet and address it to one or more of the other components on the bus. In other systems, such as a PCMCIA or ISA connection an interrupt can be set in a status register by the radio. When the interrupt is serviced, the active packet can be read from its buffer. The active packet can indicate a start time at which the radio will be active and a duration of activity.

In one embodiment, the radio subsystem directs the active signal to the power management module. This module is already configured to make a variety of different adjustments to the operating parameters of the computer. While the adjustments are designed to reduce power consumption, many will also reduce the generation of radio interference and thereby enhance radio reception. The power management module, as is well known in the art, can slow or suspend the microprocessor clock rate 108. It can turn off hard disk drives and hard disk drive controllers. It can suspend operation of the system bus 109, and it can turn off peripherals on the bus 110. All of these functions and more can be exploited to affect the level of radio interference.

The system designer for any particular computer system or power management module can determine how great of an effect on the interference level is desired and which of these functions are most likely to have the desired interference-reducing effect. These functions can then be set up to be executed in response to the radio active signal. The particular choice will depend on the configuration of the computer. For example, if the computer system includes a rotating hard disk drive, the hard disks will probably not be stopped because of the time involved, even though the high speed rotating disks do generate radio interference. On the other hand, the hard disk controller can be instructed to stop reading and writing to the disks. This will significantly attenuate the total interference generated by the computer system. Similarly, the decision to turn off the microprocessor or simply slow it down will depend on the design of the system. In one embodiment, the power management module simply applies those existing power management functions that will best attenuate the generation of radio interference. Slowing the microprocessor down, for example, will, in addition to reducing power consumption, greatly reduce the high frequency noise generated on the I/O ports and buses of the computer system. There are a variety of other interference mitigation actions that can be applied in addition to or instead of those mentioned. These can include slowing one or more of the clocks, stopping one or more of the clocks, and controlling all of the clocks or only some of the clocks.

The radio active signal can also be transmitted 106 in other ways. The radio active data packet can be directed to the particular devices which are to be affected such as the hard disk drive and the microprocessor. As with the packet sent to the power management module, these directed packets would be received and interpreted by software resident on each device. Accordingly, there will be delays in the implementation of the instructions and there may be variations in the timing of the action taken by each component. While this does not reduce the effectiveness of each adjustment in reducing noise, it does reduce the precision of the timing. In order to minimize the effect of the radio active signal on the speed of the computer, the timing should be as precise as possible. With more precise timing, the slow down or suspension of computer function can be made as short as possible. As the timing becomes less precise the duration of the adjustments must be extended to allow for the possible errors.

In another embodiment, the radio active signal is transmitted as a hardware suspend signal from the radio subsystem to the microprocessor clock generator that disables or freezes the microprocessor for as long as the suspend signal is asserted. The computer microprocessor is reactivated when the hardware signal is de-asserted. The suspend signal can be provided by a special pin on the connection between the radio CPU bus and the computer system bus. In another embodiment, the radio active signal is sent with a software interrupt signal from the radio subsystem to the microprocessor operating software that requests that the CPU shut down for a specified period. The period can be determined by the radio subsystem based on the length of the assigned time slot, or the length of time that is required to receive the broadcast channel or any other radio activity.

The timing precision of the interaction between radio subsystem and computer system can be further enhanced by this hardware control signal. If radio modem and computer vendors agree on a hardware control signal and some logic for interfacing radio modems into laptop computers, web pads, PDAs, and other devices, then the radio modems can be made interchangeable with different computers. Using such a hardware control signal, the radio modem can assert a radio active or clock-suppress signal during burst reception. A clock-pause function integrated into the clock generation circuit of the computer system can then pause the clock until the control signal is de-asserted. The hardware control signal eliminates much of the propagation delay and allows the clock suspend time to be minimized.

For some computer systems, a software interrupt signal can be used to request that the CPU shut down and a hardware interrupt can be used to wake the CPU up when reception is complete. Regardless of the approach taken to reduce radio interference, the radio subsystem will also detect the end of reception of radio signals 111, generate a radio not active signal 112, and transmit the radio not active signal to the computer system 113. As mentioned above, the active signal can also be conveyed using an interrupt. In some cases, the internal PLL (phase locked loop) clock can be shut off but still be awakened by state changes on interrupt lines. Using an interrupt line, the radio can signal the processor to wake up or to read such an instruction in a message buffer. Several different approaches to this have already been described, including a hardware interrupt and a software instruction that provides the radio active or radio receive start time and end time in a single data packet. In many radio systems, the duration of the reception can be determined based on the predictable frame-based behavior of the system. The start and end times for reception can accordingly, be determined long in advance. In other systems and when random access radio channels are being used, the start and end times are much less predictable.

Knowing the end times, whether by notification in advance, the reception of a second packet or the de-assertion of a hardware pin, the computer system can proceed, at the indicated time, to readjust its operating parameters. This readjustment again will affect the radio interference generated by the computer, typically restoring the interference to the previous level. In the examples above, this can include restoring the clock rate 114, restoring traffic on the bus 115, and restoring operation of the peripherals that were suspended 116. Since the radio receiver is inactive, the operating parameters of the computer system can be set so that the computer system's performance is optimized without regard to generating radio interference. Having attenuated the interference while the radio was active, the system can operate normally until the next period of radio activity. The process accordingly repeats 117 with the assertion of another radio active signal 104.

EXAMPLES

The invention may be better understood with reference to a specific example. A GSM or GPRS (General Packet Radio Service) radio modem generally receives for ⅛ of a 4.615 millisecond radio frame (576 microseconds). A PCMCIA card radio modem can use the CINT# signal on the PC-Card interface to interrupt the computer's main CPU. In one embodiment, the radio modem's base-band controller CPU can interrupt the computer microprocessor using the CINT# signal and send a request to turn off until the next interrupt signal. This can be done before turning on the radio receiver. 600 microseconds later, after the radio has completed its reception of the GPRS burst, while the radio receiver is being powered down, the radio's base-band controller CPU can send another interrupt. This, in effect, signals the computer microprocessor that radio reception is complete and that it is safe to turn the clock back up again.

In another example, driver software, can be provided by the radio modem maker to interface with the operating system's power management software to rapidly put the computer into and out of a sleep mode synchronously with the radio's burst operation.

In another example, a WCDMA data terminal operating in Interactive Class listens periodically to a downlink slot reservation channel. When downlink packets for the terminal are available and the base station has reserved downlink radio resources for that terminal's transmissions, the radio receives the packets. The active receive intervals are typically a small portion of the receiver's on time, so that the microprocessor can be instructed to sleep using a radio active signal during the active downlink times. Receiving the packets requires little processing power. After the file transfer is completed, the computer system can be restored to full operating capacity. This allows the transferred file to be evaluated by the computer system for errors and operated on, for example by rendering a web page.

Radio Subsystem Structure

Figure 2:
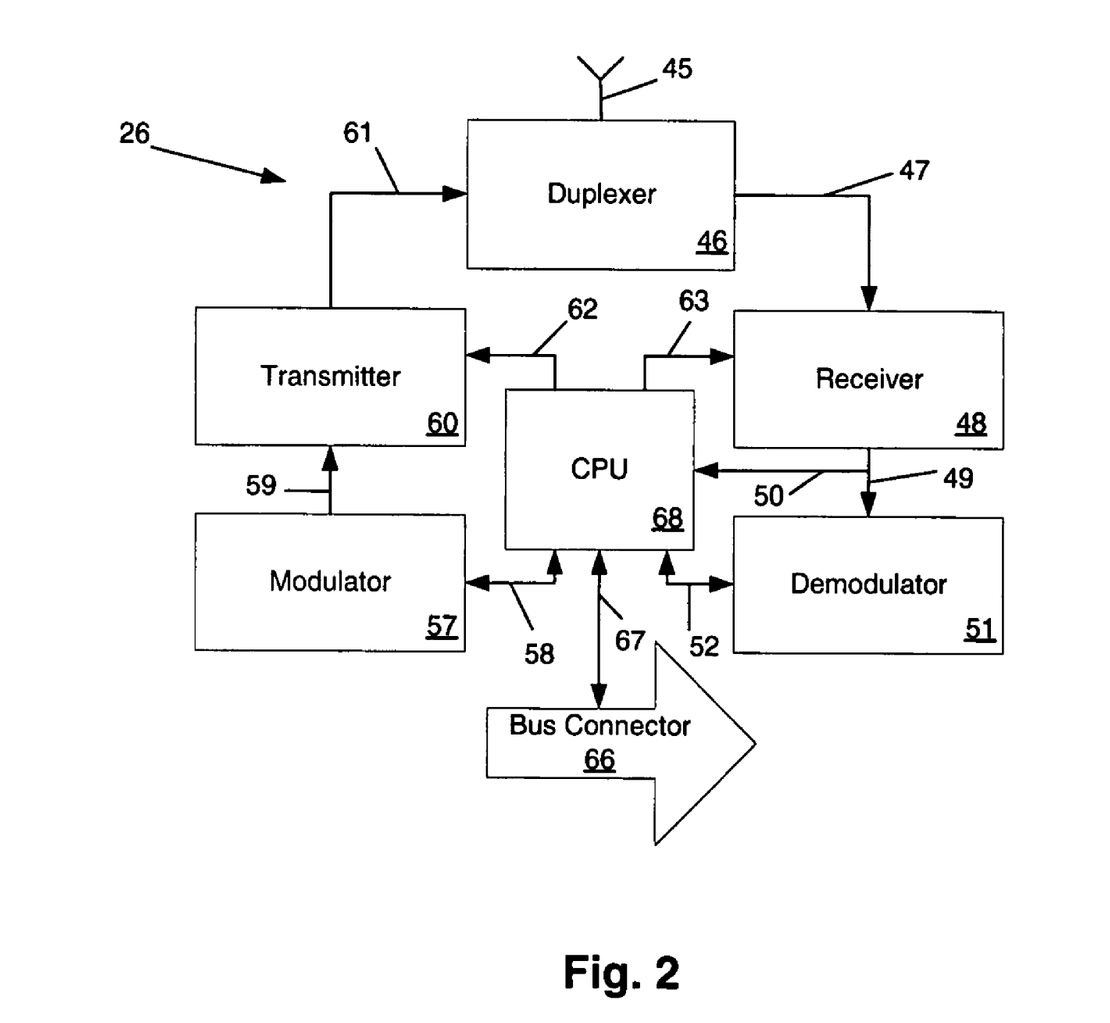
FIG. 2 is a simplified block diagram of a radio subsystem on which an embodiment of the invention can be implemented.
Figure 3:
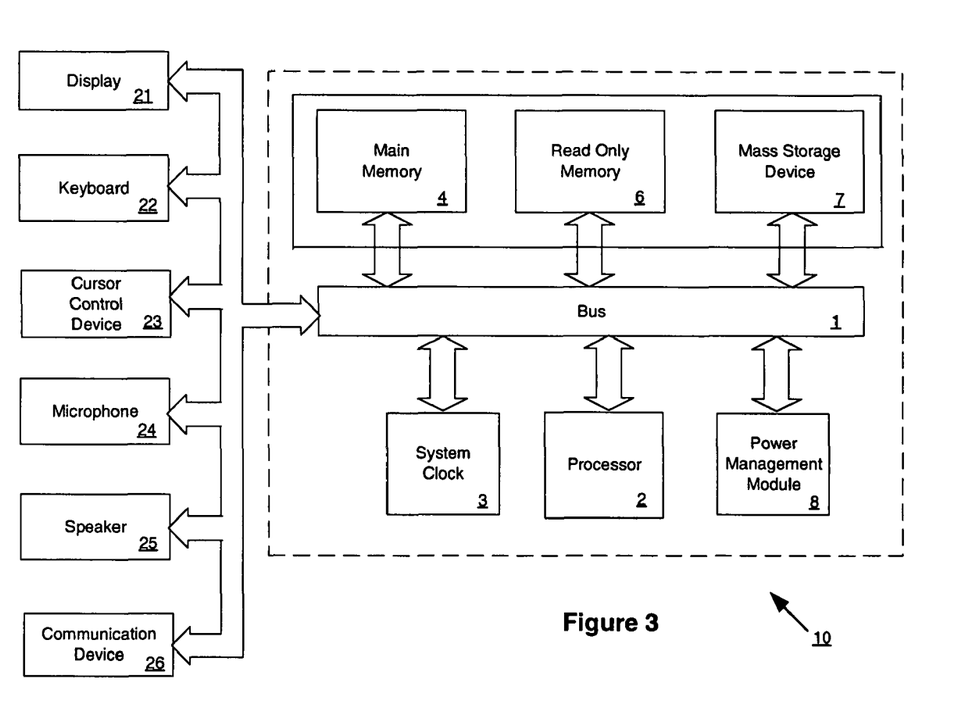
FIG. 3 is a simplified block diagram of a computer system on which an embodiment of the invention can be implemented.

FIG. 2 depicts an example of a radio subsystem 26 that can be coupled to the computer of FIG. 3 and used to implement the present invention. The component arrangement can be embodied in an external radio, such as a cellular telephone, or data messaging appliance, a plug-in card, such as a PCMCIA, MultiMedia or SDIO card, or an internal component that can connect to an internal bus, using, for example a Compact PCI, ISA (Industry Standard Architecture) connection, or internal motherboard bus. The radio subsystem can also be coupled to the computer through an infrared or short range wireless connection, such as those suggested by the standards for Bluetooth and IEEE 802.11. The remote terminal's antenna 45 is connected to a duplexer 46 to permit the antenna 45 to be used for both transmission and reception. The antenna can be omni-directional or directional. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art.

The duplexer output 47 serves as input to a receiver 48. The receiver 48 produces a down-converted amplified signal 49, which is the input to a demodulator 51. A demodulated received data packet 67 is provided to a radio CPU (central processing unit) 68 for transmission through a connection 67 to a computer bus connector 66, for example, a PCMCIA or Compact PCI connector. If the radio is internal, then the connection can be through the common PCB (printed circuit board) using conventional printed circuit connections.

The remote terminal has a corresponding transmit chain in which data packets to be transmitted are modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to the remote terminal CPU 68 as is received data before demodulation 50. The remote terminal CPU 68 can be implemented with a standard DSP (digital signal processor) device such as a Motorola 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with the coupled computer through line 67. The CPU will typically include an internal clock that can be synchronized to the radio network and which drives the other components of the radio. In some embodiments, a separate clock circuit connected to the CPU may drive the CPU and the various frequency generators of the radio for reception and transmission.

If the radio is incorporated into a remote voice terminal then it may also include a microphone, speaker, keyboard and display (not shown). Furthermore, the remote terminal CPU 68 may also include a memory element to store data, and instructions. Alternatively, the remote terminal may have a separate memory element or have access to an auxiliary memory element.

The digital interface through line 67 allows data to be transmitted to and from the computer. In one embodiment, the display, keyboard, microphone and speaker for voice or video telephony are a part of the external computer. The remote terminal's CPU 68 communicates with these components through the digital interface and the computer's controller.

Computer System Structure

FIG. 3 shows a computer system 10 representing an example of a system that can be coupled to the radio subsystem 26 of FIG. 2. The computer system can be implemented as a desktop or portable machine. It can also be implemented in one or more small portable platforms such as laptops, web pads, web tablets, PDA's (Personal Digital Assistant), wireless web devices such as personal stereos, telephones and integrated messaging systems, and other devices. The computer can be any of a variety of different microprocessor driven data or signal processing circuits and coupled or peripheral devices that may by its very operation cause interference with the radio subsystem. The computer system 10 includes a bus or other communication means 1 for communicating information, and a processing means such as a microprocessor 2 coupled with the bus 1 for processing information. A system clock 3 is coupled to each of the components through the bus and controls bus activity as well as activity of various ones of the components. Each component on the bus may also have its own clock that may or may not be synchronized to the system clock. The microprocessor may also have an internal clock (not shown) which drives the operation of the microprocessor.

The computer system 10 further includes a main memory 4, such as a random access memory (RAM) or other dynamic data storage device, coupled to the bus 1 for storing information and instructions to be executed by the processor 2. The main memory also may be used for storing temporary variables or other intermediate information during execution of instructions by the processor.

The computer system may also include a nonvolatile memory 6, such as a read only memory (ROM) or other static data storage device coupled to the bus for storing static information and instructions for the processor. A mass memory 7 such as a magnetic disk or optical disk and its corresponding drive may also be coupled to the bus of the computer system for storing information and instructions such as the various databases.

A power management module 8 can also be connected to the bus. The power management module can be a discrete component including its own microprocessor or it can be a software or firmware module incorporated into the microprocessor. The power management module operates to reduce unnecessary battery drains in a portable device or to reduce unnecessary power consumption in a fixed device. It monitors the activity level of the computer system and controls system components to reduce unnecessary power consumption. It may adjust the system clock speed or the speed of different component clocks and it may shut various components on and off depending on the need for the component, demands placed on the components or activity level of a component.

The computer system can also be coupled via the bus to a display device or monitor 21, such as a cathode ray tube (CRT) or Liquid Crystal Display (LCD), for displaying information to a user. For example, graphical and textual indications of installation status, operations status and other information may be presented to the user on the display device. Typically, an alphanumeric input device 22, such as a keyboard with alphanumeric, function and other keys, may be coupled to the bus for communicating information and command selections to the processor. A cursor control input device 23, such as a mouse, a trackball, or cursor direction keys can be coupled to the bus for communicating direction information and command selections to the processor and to control cursor movement on the display 21.

A microphone 24 and speaker 25 can also be connected to the bus for communications purposes or to play back any received sounds. Similarly, a camera (not shown) can be connected to the bus to operate with the display device for video conferencing purposes. As mentioned above, the microphone and speaker can also be in the connected radio and operated by the microprocessor through the bus.

The radio subsystem 26 of FIG. 2 is also coupled to the bus 1 through its bus connector 66 as mentioned above. The radio subsystem can be coupled to the computer system in any of a variety of other ways, as mentioned above. Typical connections include infrared and wireless radio interfaces, PCM-CIA, MultiMedia, SDIO card, Compact PCI, ISA (Industry Standard Architecture), and an internal motherboard bus. While the specific interconnection of the radio subsystem to the rest of the computer system may affect the specific signaling that is available, it does not affect the fundamental operation of the invention.

Other communication devices may also be coupled to the bus such as a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped radio subsystem or computer system than the examples described above may be preferred for certain implementations. Therefore, the configuration of the radio subsystem 26 and computer system 10 will vary from implementation to implementation depending upon numerous factors, such as price constraints, performance requirements, technological improvements, or other circumstances.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the radio subsystem or the computer system. However, many of the steps described as being performed by the radio subsystem may be performed by the computer system and vice versa.

While specific interference mitigation actions have been described above, any number of other actions can be applied in addition or instead of those mentioned. These can include slowing one or more of the clocks, stopping one or more of the clocks, and controlling all of the clocks or only some of the clocks.

Significant reductions in radio interference can be accomplished with software messages using interrupts and existing functions of the battery power consumption control module. For still more interference reduction, more clocks can be suppressed including DC-DC converters, disk drive controller subsystems, etc. On the other hand, the computer main processor clock is the highest frequency device and therefore a problematic source of interference. Reducing that source of interference by itself provides a substantial performance benefit.

Furthermore, while the radio subsystem is described as a remote terminal communicating with a base station, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices. In portions of the description above, the present invention is described in the context of a TDMA wireless network such as GSM. However the present invention is applicable to any other air interface or protocol.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
determining a start of reception of radio signals by a radio;
generating a radio active packet, the packet including a radio receive start time to indicate the determined start of reception and the packet being addressed to a component of a coupled computer;
transmitting the radio active packet to the coupled computer over a high speed data communications bus to affect the radio interference generated by the coupled computer.

2. The method of claim 1, wherein determining the start of reception comprises predicting the start time using a timing reference of the radio.

3. The method of claim 1, wherein a time slot of a repeating time division multiplex frame has been assigned to the radio, and wherein the assigned time slot is a receive time slot assigned to the coupled computer and wherein predicting the start time comprises predicting the start time using the coupled computer's clock as a timing reference.

4. The method of claim 1, wherein transmitting the radio active packet comprises setting an interrupt in a status register of the high speed data communications bus.

5. The method of claim 1, wherein transmitting the radio active packet comprises loading the packet in a register that is linked to servicing the interrupt.

6. The method of claim 1, wherein the radio active packet includes a radio receive start time and a radio receive end time in a single packet.

7. The method of claim 6, further comprising predicting the end of reception based on the start time and the expected duration of reception.

8. The method of claim 1, wherein the radio active packet indicates the start time and the duration of the radio reception.

9. The method of claim 1, wherein transmitting the radio active packet comprises addressing the packet to operating system software of the coupled computer.

10. The method of claim 1, wherein transmitting the radio active packet comprises addressing the packet to a power management module of the coupled computer.

11. A machine-readable medium having stored thereon data representing instructions which, when executed by a machine, cause the machine to perform operations comprising:
determining a start of reception of radio signals by a radio;
generating a radio active packet, the packet including a radio receive start time and the packet being addressed to a component of a coupled computer;
transmitting the radio active packet to the coupled computer over a high speed data communications bus to affect the radio interference generated by the coupled computer.

12. The medium of claim 11, wherein the radio active packet indicates the start time and the duration of the radio reception, and wherein the instructions further comprise instructions which, when executed by the machine, cause the machine to perform further operations comprising predicting the end of reception based on the start time and the expected duration of reception.

13. A radio comprising:
a receiver;
a processor to determine a start of reception of radio signals by the receiver and generate a radio active packet including the radio reception start time and the packet being addressed to a component of a coupled computer; and
an external interface to a high speed data communications bus of the coupled computer to transmit the radio active packet over the bus to the coupled computer to affect the radio interference generated by the coupled computer.

14. The radio of claim 13, further comprising a connector between the radio and the coupled computer coupled to the external interface and wherein the processor sets an interrupt in a status register of the high speed data communication bus through the connector.

15. A method comprising:
receiving a radio active packet over a high speed data communications bus at a computer having a central processing unit from a coupled radio, the radio active packet indicating a start of reception of radio signals by the coupled radio and being addressed to a component of the computer; and
adjusting system operating parameters of the computer in response to the packet to reduce interference with the radio.

16. The method of claim 15, wherein adjusting the system operating parameters comprises reducing the system clock rate.

17. The method of claim 15, wherein adjusting the system operating parameters comprises interrupting traffic on the computer system bus.

18. The method of claim 15, wherein adjusting the system operating parameters comprises suspending operation of selected peripheral components of the computer.

19. A machine-readable medium having stored thereon data representing instructions which, when executed by a machine, cause the machine to perform operations comprising:
receiving a radio active packet over a high speed data communications bus at a computer having a central processing unit from a coupled radio, the radio active packet indicating a start of reception of radio signals by the coupled radio and being addressed to a component of the computer; and
adjusting system operating parameters of the computer in response to the packet to reduce interference with the radio.

20. The medium of claim 19, further comprising instructions which, when executed by the machine, cause the machine to perform further operations comprising polling a status register on the high speed data communications bus for an interrupt and then reading the packet from an associated register.

21. The medium of claim 19, wherein the instructions for receiving the radio active packet comprise instructions which, when executed by the machine, cause the machine to perform further operations comprising loading the packet in a register that is linked to servicing the interrupt.

22. A computer comprising:
an Input/Output data communications bus to receive a radio active packet from a coupled radio, the radio active packet indicating a start time and an end time for reception of radio signals by the coupled radio, the packet being addressed to a component of the computer; and
a central processing unit coupled to the bus to adjust system operating parameters of the computer to reduce interference with the and to readjust the system operating parameters of the computer for operation without regard to interference with the radio in response to the radio active packet.

23. The computer of claim 22, further comprising a connector coupled to the Input/Output data communications bus and wherein the Input/Output data communications bus receives the radio active packet by detecting a state of a status register on the connector and reading the radio active packet from an associated register.

24. The computer of claim 22, further comprising a power management module coupled to the central processing unit to receive an instruction from the central processing unit to execute power management functions to reduce interference.

25. A method comprising:
   determining a start of reception of radio signals by a radio;
   generating a radio active packet, the packet including a radio receive start time and the packet being addressed to a component of a coupled computer;
   transmitting the radio active packet to the component of the coupled computer to which the packet is addressed to affect the radio interference generated by the coupled computer.

26. The method of claim 25, wherein a time slot of a repeating time division multiplex frame has been assigned to the radio, and wherein the assigned time slot is a receive time slot assigned to the coupled computer and wherein predicting the start time comprises predicting the start time of the assigned time slot.

27. The method of claim 25, wherein transmitting the radio active packet comprises loading the packet in a register corresponding to the component to which the packet is addressed.

28. The method of claim 25, wherein the component to which the packet is addressed comprises a power management module of the coupled computer.

* * * * *